Feb. 5, 1935.  J. B. WHITE  1,990,443
ROTARY VALVE DRIVING MECHANISM
Filed Oct. 24, 1934   2 Sheets-Sheet 1
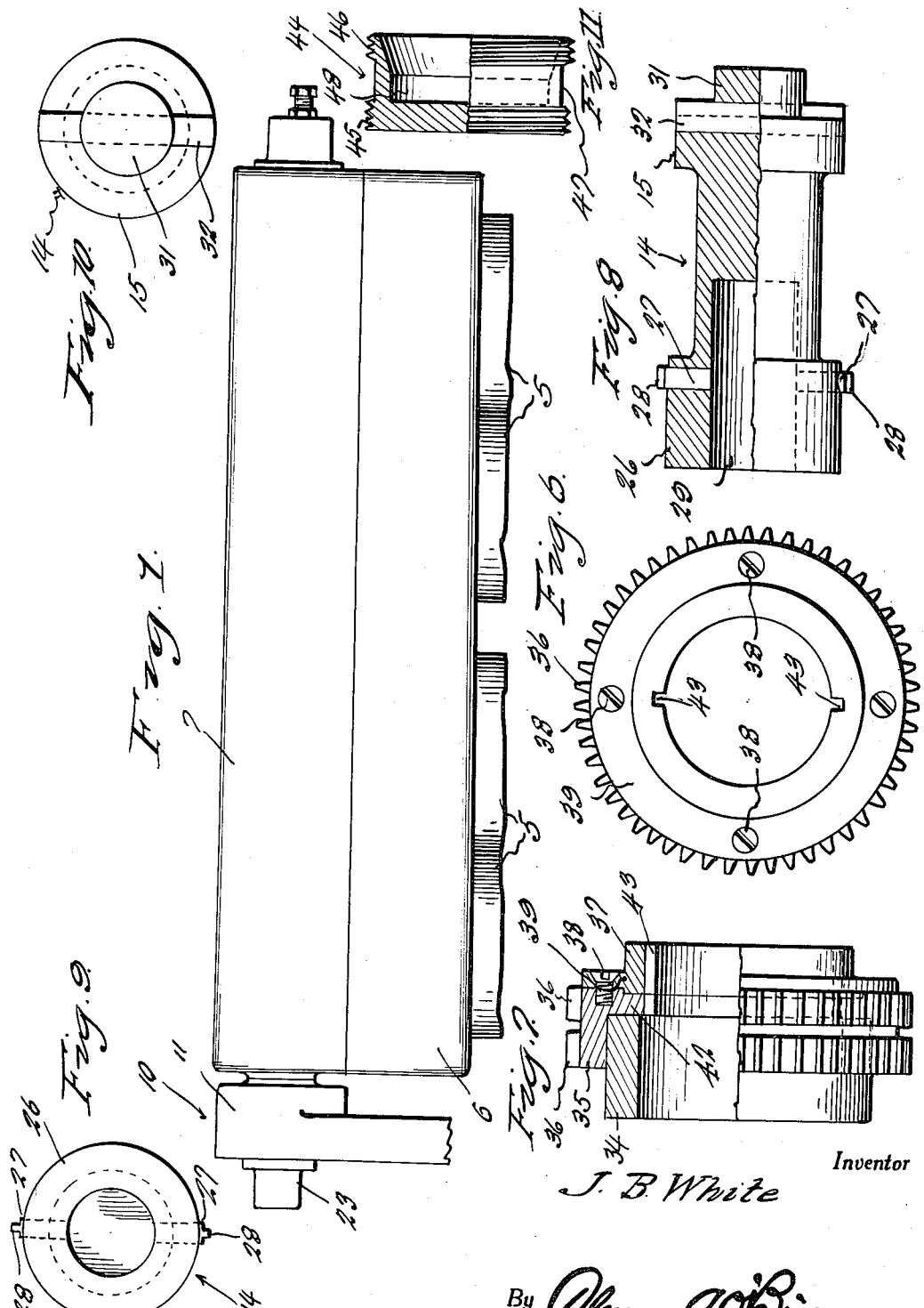
Inventor
J. B. White
By Clarence A. O'Brien
Attorney Feb. 5, 1935.  J. B. WHITE  1,990,443
ROTARY VALVE DRIVING MECHANISM
Filed Oct. 24, 1934  2 Sheets-Sheet 2
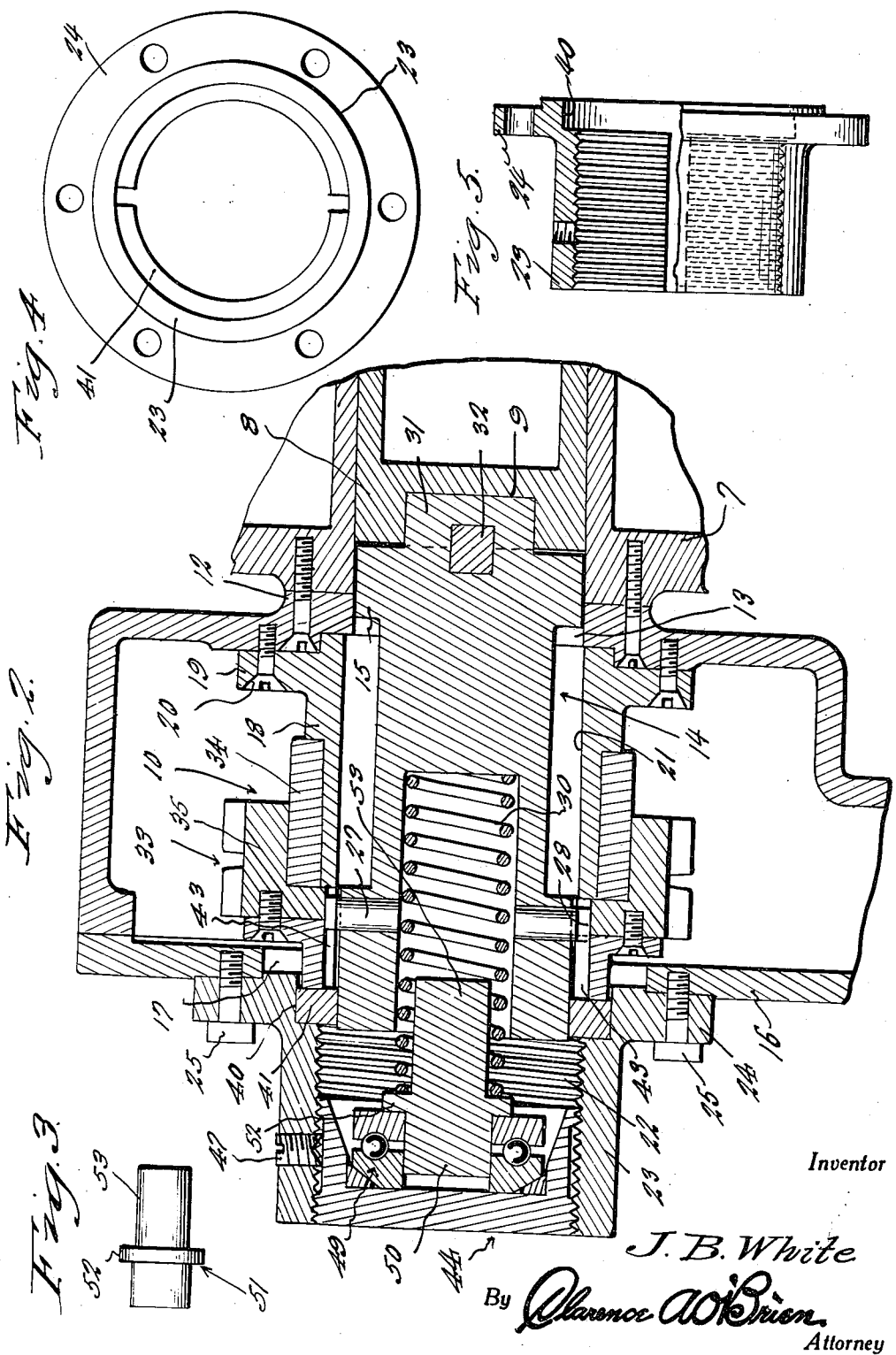
Inventor
J. B. White
By Clarence A. O'Brien
Attorney Patented Feb. 5, 1935

1,990,443

UNITED STATES PATENT OFFICE 1,990,443

ROTARY VALVE DRIVING MECHANISM

John B. White, Portland, Oreg., assignor to White Rotary Valve Corporation, a corporation of Oregon Application October 24, 1934, Serial No. 749,859

3 Claims. (Cl. 123—59)

This invention relates to improvements in valve driving mechanisms, and more particularly to driving means for rotary valves.

The principal object of this invention is to provide a driving mechanism for rotary valves wherein means is provided for relieving the valve proper of the usual stress and strain of a laterally disposed power connection.

Another important object of the invention is to provide a driving mechanism for rotary valves wherein means is provided for breaking the connection between the valve proper and the motive device to prevent expensive damage to the mechanism.

Other important objects and advantages of the invention will become apparent to the reader of the following specification and claims.

In the drawings:—

Figure 1 represents a fragmentary side elevational view of an engine equipped with the improved driving means.

Figure 2 represents an enlarged fragmentary detailed sectional view of the valve driving means.

Figure 3 represents a side elevational view of the spring guide.

Figure 4 represents an end elevation of the internally threaded collar.

Figure 5 represents a side elevational view of the collar partly broken away to disclose the interior thereof.

Figure 6 is a side elevational view of the gear.

Figure 7 is a side elevational view of the gear partly broken away to show the assembling arrangement thereof.

Figure 8 represents a side elevational view of the driving core, partly in section.

Figure 9 represents an end elevation of the driving core.

Figure 10 represents an end elevation of the driving core looking at the opposite end from that shown in Figure 9.

Figure 11 represents a side elevational view, partly in section, of the spring adjusting plug.

Referring to the drawings wherein like numerals designate like parts, it can be seen in Figure 1 that numeral 5 represents the cylinders of a four-cylinder engine, with numeral 6 representing the cylinder head upon which the jacket 7 is located in which the rotary valve 8 is operative.

The valve 8 is of the rotary cylindrical or tapered type, and has a centralized recess 9 in the end thereof adjacent the driving mechanism generally referred to by numeral 10. This recess 9 is intersected by a diametrically disposed slot.

The valve driving mechanism includes a substantially circular-shaped housing 11 provided with an annular boss 12, surrounding the opening 13, through which the driving core, generally referred to by numeral 14, extends at its enlarged end 15. The housing 11 is opened at its outer side to accommodate the closure plate 16 having the circular opening 17 therein on a line with the opening 13 and bore in which the valve 8 operates.

Secured to the inner wall of the housing 11 is a tubular trunnion 18 having its flanged end portion 19 secured to the housing by screws 20. This trunnion 18 is fixed so that its bore 21 will be aligned with the opening 13 at one end and with the threaded bore 22 of the collar 23 at its opposite end. This collar 23 has a flange 24 at its inner end secured to the closure plate 16 by screws 25.

As is clearly shown in Figure 8, the driving core 14 has an enlarged head 26 at its end opposite to the enlarged end 15 and at the inner end of this head 26 are located the pins 27—27, the same having been driven into diametrically aligned openings in the head, so that only their reduced extremities 28 project beyond the periphery of the head 26. Extending inwardly from the adjacent end of the core 14 is a pocket 29, which receives one end of the spring 30, shown in Figure 2.

It will be observed at this point that the head 15 of the core 14 has a boss 31 at its free end. This boss has a diametrically disposed opening therein through which the key 32 is disposed, preferably by a wedging action, and this key 32 is adapted for engagement in the diametrically disposed slot intersecting the recess 9 on the end of the valve 8, shown in Figure 2. (The slot is not shown.)

At this point, let it be understood that the trunnion 18 serves the purpose of a support for the gear assembly, generally referred to by numeral 33, thus relieving the valve proper of the stress and strain incident to a lateral drive.

The trunnion 18, as shown in Figure 2, is reduced to accommodate the wear resisting bearing ring 34 on which the section 35 of the gear assembly rides.

As is clearly shown in Figures 2, 6 and 7, the gear section 35 carries a pair of rows of teeth 36 which may be used in conjunction with a sprocket chain or in mesh with a string of gears. Secured to one side of the gear section 35 is the gear section 37, the same being secured to the section 35 by screws 38 passing through the flange 39 of the section 37. This section 37 engages within the reduced portion 40 of the collar 23 and against the packing element 41.

As is clearly shown in Figures 2, 6 and 7, the inwardly extending portion 42 of the section 35 and the section 37 are provided with aligned slots 43—43, diametrically opposed to accommodate the reduced ends 28—28 of the pins 27 on the driving core 14.

A spring adjusting plug, generally referred to by numeral 44, is provided with two threaded areas 45 and 46 on its periphery, separated by a circumferentially extending reduced portion into which the inner end of the set screw 47 can engage and bite against the plugs 44 to prevent self-adjusting thereof. This plug 44 is adapted to be threaded into the collar 23, the same being provided with a pocket 48 therein for accommodating the ball bearing assembly, generally referred to by numeral 49. For disposition into this ball bearing assembly 49 is the head 50 of the spring guide generally referred to by numeral 51, the said guide being provided with a circumferential flange 52 at its intermediate portion to limit its position against the bearing 49.

The shank portion 53 of the guide projects through a substantial number of the convolutions of the spring 30, and as shown in Figure 2, one end of this spring impinges against the aforementioned flange 52. Obviously, the tension of the driving core 14 against the valve 8 can be regulated by adjusting the plug 44.

It can now be seen that when the gear 33 is properly connected with the motor, regardless of how much stress is imparted to the trunnions 18, this stress will be taken up by the trunnions and not transmitted to the driving core 14. This driving core is free to slide longitudinally within the valve 8, if the valve has a tendency to slide, due to expansion or contraction, and furthermore, in the event the valve becomes stuck or something happens to the driving connection, no damage will occur to the driving mechanism aside from the mere shearing off of the reduced extremities 28—28 of the frangible pins 27.

While the foregoing specification sets forth the invention in specific terms, it is to be understood that numerous changes in the shape, size and materials may be resorted to without departing from the spirit or scope of the invention as claimed hereinafter.

Having thus described my invention, what I claim as new is:—

1. In combination, a rotary valve, a fixed support for the gear, a driving core, a key connection between one end of the core and the valve, a spring for effecting tension against the opposite end of the core, and a splined connection between the gear and the core.

2. Driving means for rotary valves comprising a driving core for detachable connection with the valve to be driven, a rotatably mounted gear supported independently of the core, said gear having an opening therein through which the core extends, and a splined connection between the core and the gear.

3. A driving mechanism for rotary valves comprising a core detachably connected to the valve to be driven, a gear independently supported with respect to the core, said gear having a slot therein, said core having a pin thereon provided with a reduced extremity for engagement into the slot of the gear.

JOHN B. WHITE.